Dec. 11, 1923.
S. C. BEALE
1,476,945
BEET HARVESTING MACHINE
Original Filed May 5, 1919   5 Sheets-Sheet 1
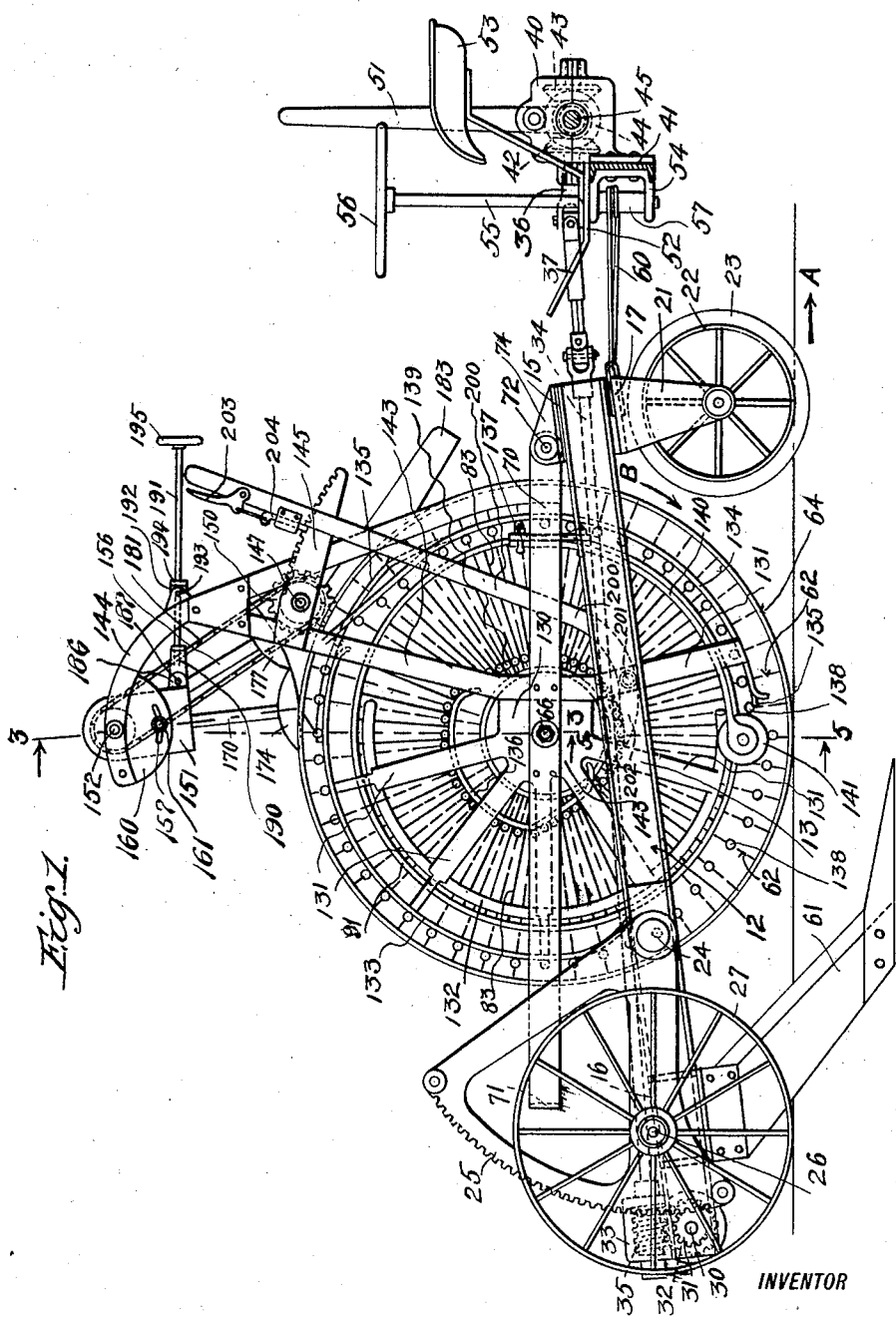
INVENTOR
Samuel C. Beale
Edmund A. Strauss
ATTORNEY

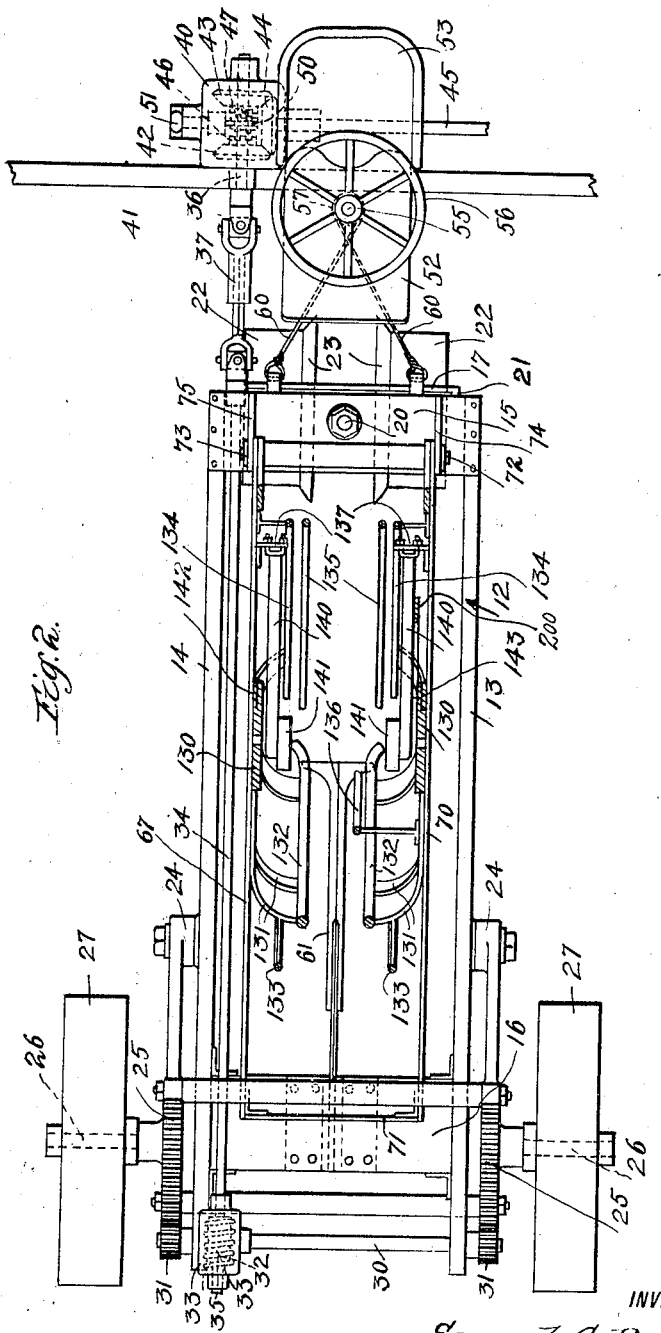

Dec. 11, 1923.
S. C. BEALE
1,476,945
BEET HARVESTING MACHINE
Original Filed May 5, 1919   5 Sheets-Sheet 3
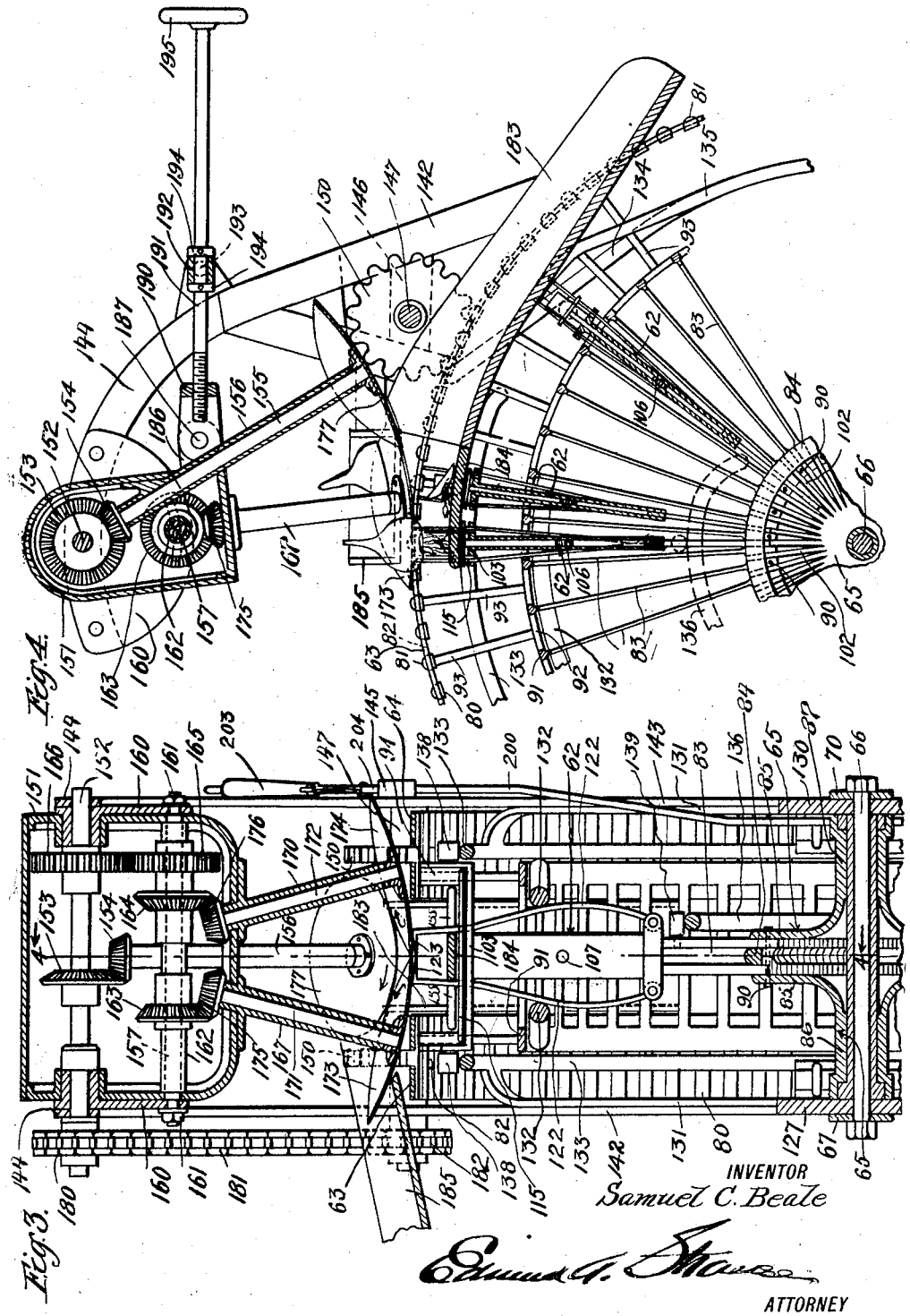
INVENTOR
Samuel C. Beale
ATTORNEY

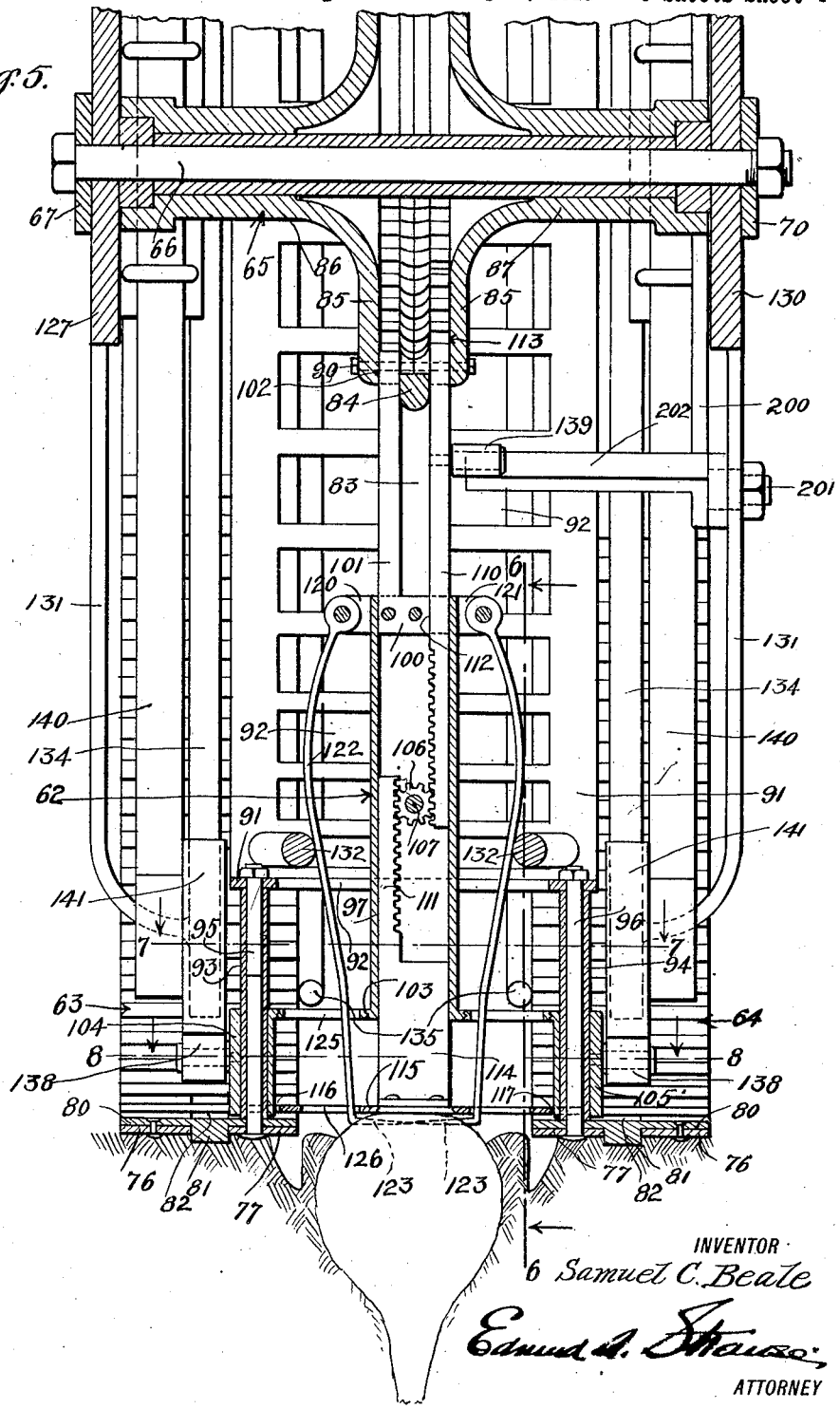

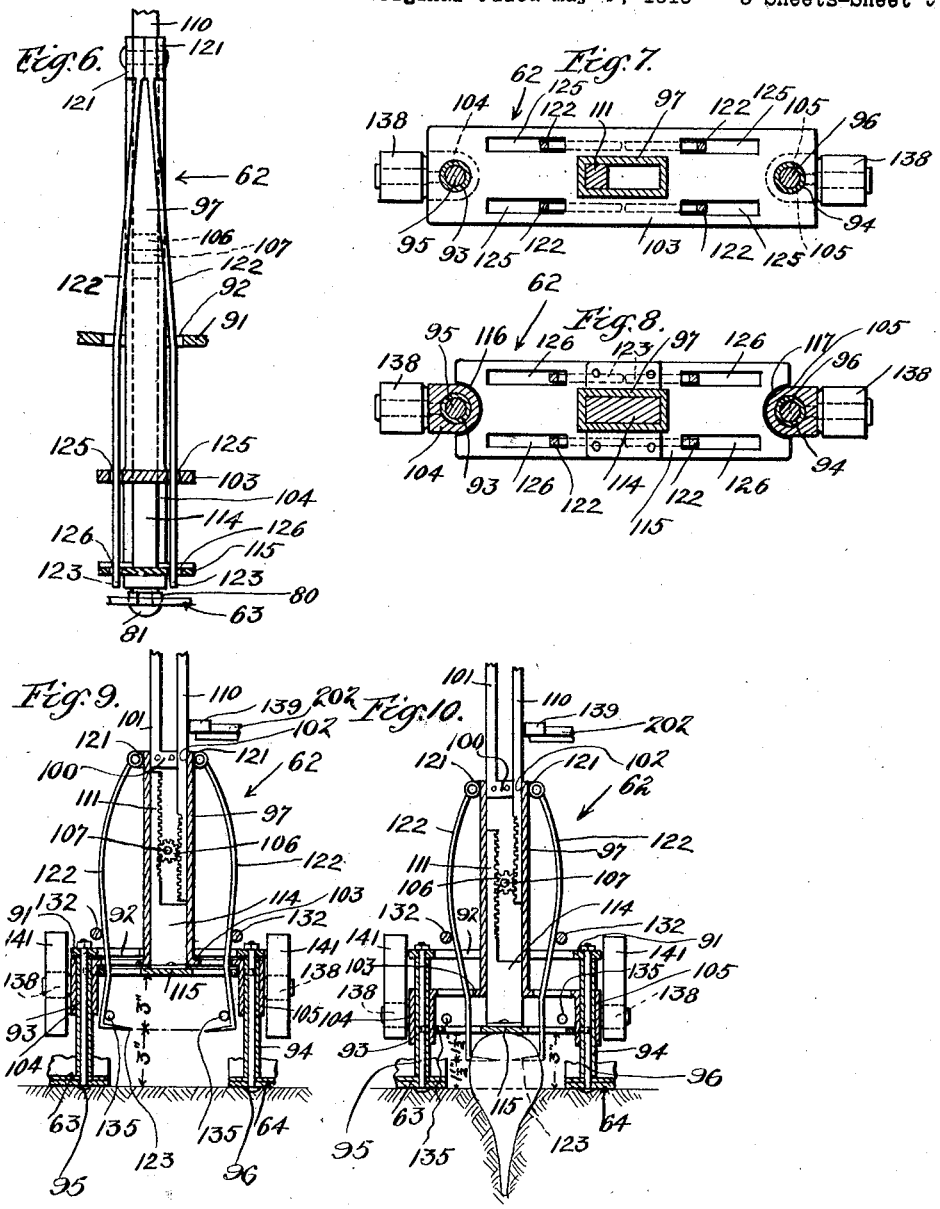

Patented Dec. 11, 1923.

1,476,945

UNITED STATES PATENT OFFICE.

SAMUEL C. BEALE, OF LOS ANGELES, CALIFORNIA, ASSIGNOR TO HORATIO J. FORGY, TRUSTEE, OF SANTA ANA, CALIFORNIA.

BEET-HARVESTING MACHINE.

Application filed May 5, 1919, Serial No. 294,899. Renewed December 12, 1921. Serial No. 521,924.

*To all whom it may concern:*

Be it known that I, SAMUEL C. BEALE, a citizen of the United States, residing at Los Angeles, in the county of Los Angeles and State of California, have invented Beet-Harvesting Machines, of which the following is a specification.

This invention relates to beet harvesting machines, and is particularly adapted to be used for the harvesting of beets of the sugar variety, which are transported to the refineries and made into sugar.

In the Patent #1,272,604 granted jointly to myself and Anna B. Knight, entitled Beet harvesters, granted July 16, 1918, is shown and described a beet harvester of the same general type as my present invention, which briefly, provides means for pulling beets out of the ground, after they have been loosened by a plow, while passing over a row, and carrying them to topping knives where the tops are severed from the body portion.

In all beets used for sugar purposes there is a proportion of waste. Certain portions of the beet are absolutely worthless for the making of sugar, and this waste portion is that part of the beet which is near the foliage and including part of the beet which projects out of the ground at harvesting time. The expert beet buyer generally estimates the amount of tare due to this worthless portion of the beet and deducts the same from the gross weight and pays the farmer only for the part which is valuable for sugar purposes. This is a hardship to the farmer, inasmuch as he not only pays for the transportation of the part of the beet not used in the factory but loses the same for his own use, this waste part being valuable to him for the feeding of stock or to be turned into the ground for fertilizing purposes.

The main object of my invention is to provide a machine which will pass along the ground over the beet rows, pull the beets from the ground, and top the same with reference to that portion of the beet which projects out of the ground, deliver the beets to a proper receptacle and the beet tops to another receptacle.

A further object of my invention is to provide means whereby the beet pulling mechanism may be properly adjusted with respect to the surface of the ground to compensate for the sinking therein of the carrying mechanism when the ground is soft and soggy.

A still further object is to provide means for eliminating grass and other foreign substances from the pulling and topping mechanism whereby all danger of clogging of said mechanism may be avoided and the beets delivered to the receptacle in a clean manner.

I accomplish the above and other objects by means of the mechanism herein described and illustrated in the accompanying drawings in which:

Fig. 1 represents a side elevation of my harvesting machine in operable position embodying by improvements, the beet pulling devices being indicated conventionally in dotted lines, due to the smallness of the scale of the drawing.

Fig. 2 is a sectional plan view of my machine, the beet carrying and pulling mechanism being omitted for the sake of clearness.

Fig. 3 is an enlarged transverse section through the top portion of the machine taken on the line 3—3 of Fig. 1, viewed in the direction indicated by the arrows, the duplication of parts which would appear in the back ground being omitted for the sake of clearness.

Fig. 4 is a fragmental longitudinal section taken on the line 4—4 of Fig. 3, viewed in the direction indicated by the arrows, showing only a few of the many beet pulling devices.

Fig. 5 is a greatly enlarged transverse section through the lower part of the machine taken on the line 5—5 of Fig. 1, the multiplicity of beet pulling devices which would appear in the back ground being omitted to avoid confusion.

Fig. 6 is a section taken on the line 6—6 of Fig. 5 showing one of the beet pulling devices.

Fig. 7 is a section through one of the beet pulling devices taken on the line 7—7 of Fig. 5.

Fig. 8 is a section through one of the beet pulling devices taken on the line 8—8 of Fig. 5.

Fig. 9 is a section through one of the beet pulling devices showing its position when ready to grasp a beet.

Fig. 10 is a similar view showing the pulling device after it has grasped a beet.

In carrying out my invention I preferably employ a frame 12, comprising a pair of side rails 13 and 14, preferably formed of channel irons, disposed in parallel relation, suitably spaced apart and held rigidly together by the plates 15 and 16. A yoke 17 is pivoted to the plate 15 at the front end of the truck by the kingbolt 20, and is provided with depending bearing arms 21, in which the front wheels 22 are mounted. These wheels have a broad tread in order that they shall not sink unduly in the ground, and are provided on their inner peripheral surfaces with the disk shaped knife edged flanges 23 adapted to cut into the ground on each side of a row of beets and cut through any grass or foreign substance which may be lodged near the beets, in order that the beet pulling devices may have a free and unrestricted passage to the beets while performing their functions.

Pivoted near the rear end of the frame 12 to each of the side rails 13 and 14 as at 24, are toothed segments 25, each of which is provided with a stud 26 upon which the rear wheels 27 of the truck are journaled. A transverse shaft 30 is journaled in the side rails 13 and 14, and has secured on its ends pinions 31 adapted to mesh with the toothed segments 25. Secured to the shaft 30 at a point between the pinions 31, is a worm wheel 32 adapted to rotate in the housing 33 which is secured to the rail 14, and journaled in this housing is one end of the shaft 34 having secured thereto a worm 35 which meshes with the worm wheel 32 to rotate the same.

The forward end of shaft 34 is secured to shaft 36 by means of a knuckle joint 37, shaft 36 being journaled in a housing 40 mounted on a beam 41. Loosely journaled on shaft 36 in housing 40 are the oppositely disposed miter gears 42 and 43 which are adapted to be rotated by the miter gear 44 mounted on a shaft 45 journaled in the housing 40. The miter gears 42 and 43 are each provided with oppositely disposed clutch members 46 and 47 and adapted to slide on and rotate with the shaft 36. At a point between these members is the clutch member 50. The member 50 is adapted to be shifted into and out of engagement with either of the members 46 and 47 by means of an operating lever 51.

Mounted on the beam 41 is a platform 52 provided with an operator's seat 53, which is arranged adjacent lever 51, and journaled in a bearing 54 secured to the beam 41 is the stem 55 provided with the hand wheel 56, which is also arranged adjacent the operator's seat.

The lower end of stem 55 is provided with a drum 57 around which passes a cable 60, the ends of which are secured to the yoke 17 for the purpose of guiding the machine during its operation.

Secured to the cross plate 16 is the plow share 61 adapted to pass through the ground under a row of beets to loosen them, preliminary to their being pulled, and to also cut off their long depending roots.

From the foregoing description it will be seen that I have provided a simple means for vertically adjusting the plow share 61 and regulating its position to accommodate beets of different lengths, as well as a means of accurately steering the machine when in operation and in proper relation with a row of beets, which briefly is as follows:

The machine is adapted to be drawn over the ground by means of a power tractor (not shown), and to this end the beam 41 is secured thereto in any suitable manner, the shaft 45 being geared to the tractor engine and constantly driven thereby. The operator sits upon the seat 53 and by manipulation of the lever 51 shifts the clutch member 50 to engage with one or other of the clutch members 46 and 47 to revolve the shaft 34 in the direction desired. The worm 35 engaging with the worm wheel 32 causes the shaft 30 to revolve, which in turn, through the gears 31, meshing with the toothed segments 25, causes the frame 12 which carries the plow share to rise or lower as desired. The operator sits backward with respect to the direction of the advance of the machine and by looking downwardly has a clear view of the row of beets and by manipulation of the hand wheel 56 is enabled to guide the machine in an accurate operable direction.

The beet pulling mechanism 62 is supported on a pair of wheels 63 and 64 suitably secured together, adapted to rest upon the ground and to be rotated in unison by traction thereon. These wheels are arranged one on each side of the beet row and are provided with the hub 65 journaled on the shaft 66 which is secured at opposite ends to the side bars 67 and 70 of a frame having secured thereto the spacer bar 71 at the rear thereof. The front ends of the side bars 67 and 70 are pivoted at 72 and 73 to ears 74 and 75 secured to the plate 15 mounted on the main frame 12 of the machine.

Each of the wheels 63 and 64 is preferably formed of a pair of annular bands 76 and 77 of sheet metal, arranged side by side and spaced a short distance apart and held in rigid relation by the cross bars 80 having a lug 81 interposed between them and projecting slightly beyond their peripheries. The bars 80 are spaced suitably apart around the inner peripheral edges of the annular bands 76 and 77 and are riveted thereto, thus leaving a plurality of apertures 82 adapted to receive the teeth of a pair of gears which will hereinafter be described. The lugs 81 not only form part of a gear but serve to imbed themselves into the ground to give added traction and insure a constant revolution to the wheels 63 and 64.

The spokes 83 of the wheels 63 and 64 are spaced equally apart and project radially from a ring 84 which is clamped firmly between the oppositely disposed flanges 85, of the two members 86 and 87 of the hub 65 by means of bolts 90. Secured to the outer ends of the spokes 83, is the annular band 91 of somewhat smaller diameter than the wheels 63 and 64, which is provided with a plurality of elongated apertures 92 in its periphery. Interposed between the outer peripheral surface of the annular band 91 at a point near each of its outer edges, and the inner peripheral surfaces of the wheels 63 and 64, are a plurality of radially disposed sleeves 93 and 94, and passing through said sleeves and suitable apertures in the band 91 and the wheels 63 and 64 are the bolts 95 and 96. Thus it will be seen that the wheels 63 and 64, the band 91, and the hub 65, are all firmly secured together and adapted to revolve in unison.

A plurality of the beet pulling devices 62 radiate from the center of rotation of the wheels 63 and 64 and are carried thereby, they being disposed between the spokes 83, and as they are identical in construction, one only will be described.

Each of the devices 62 comprises a hollow elongated shell 97, provided at its inwardly extending end with a plug 100, having a rod 101 extending therefrom, adapted to fit in a socket 102 formed at the junction of the centrally disposed flanges 85 of the wheel hub 65. The shell 97 is provided at its opposite or outwardly extending end, with a flange 103 having a pair of oppositely disposed sleeves 104 and 105 secured thereto, adapted to surround the sleeves 93 and 94 respectively for sliding relation thereon. A pinion 106 is located within the shell 97 and is secured to a shaft 107 journaled in opposite sides of said shell, and is adapted to engage with the teeth of rack-bars 110 and 111 slidably mounted therein and arranged on opposite sides of said pinion. The rack-bar 110 passes through an aperture 112 in the plug 100, and is adapted to slide in a socket 113 formed in the flange 85 of the wheel hub 65. The rack-bar 111 extends outwardly through the end of the shell 97, and is provided with an enlarged portion 114 adapted to fit snugly in said shell, and has secured to its end a gauge plate 115 arranged in parallel relation to the flange 103, which is provided on its outwardly extending ends with notches 116 and 117, adapted to partially encompass the sleeves 104 and 105 with sliding relation therewith. The shell 97 is provided at its inwardly extending end with oppositely disposed ears 120 and 121. Gripping jaws 122, preferably formed of spring steel, provided with the gripping prongs 123 at their free ends, are arranged in pairs, and each pair is respectively hinged to the ears 120 and 121, and is guided and held in proper relation by the slots 92, 125, and 126 in the band 91, the flange 103, and the plate 115 respectively.

To the side bars 67 and 70 of the frame are secured respectively the plates 127 and 130, which are provided with a plurality of radially disposed arms 131, which support the arched tracks 132, 133, 134, 135 and 136, and secured also to the side bars 67 and 70, at 137, are the ends of the arched spring members 140, which are provided at their opposite ends with the rollers 141.

The tracks 132 are adapted to engage with the gripping jaws 122 to force them into engagement with a beet. The tracks 133 and 134, are adapted to engage with rollers 138, secured to the sleeves 104 and 105 to impart reciprocating movement thereto. The tracks 135 are adapted to engage with the gripping members 122, to force them out of engagement with a beet and hold them in such position for a limited time. The tracks 136 are adapted to engage with rollers 139 secured to the rack bars 110.

Secured to the side rails 67 and 70 are the standards 142 and 143 which are suitably braced and project upwardly and terminate in the goose-neck ends 144, and secured to one of these standards is a segmental rack 145, and to the opposite standard a bar 146. Journaled in the members 145 and 146, is a shaft 147, having secured thereto the gear wheels 150 adapted to engage with the teeth formed by the lugs 81 on the wheels 63 and 64. The goose-neck ends 144, have mounted between them a housing 151, which is pivoted on a shaft 152 supported thereon. Secured to the shaft 152 and located within the housing 151 is a bevel gear 153 adapted to mesh with a pinion 154 secured to a downwardly projecting shaft 155 journaled in a bearing 156 secured to said housing. Another shaft 157 located just below the shaft 152, passes through elongated apertures in the sides of the housing 151 and is secured at its free ends to depending plates 160 arranged one on each side of said housing. The plates 160 are fastened to the goose-neck ends 144, and the ends of the shaft 157 are secured to said plates by means of the nuts 161. By this arrangement it will be seen that by loosening the nuts 161 the housing may be swung on the shaft 152 in either direction, and clamped in such adjusted position. A sleeve 162 is mounted for rotation on the shaft 157, and has secured thereon the bevel gears 163 and 164 and the spur gear 165, which is adapted to mesh with the spur gear 166 secured to the shaft 152.

Depending from the bottom of the housing 151 and secured thereto are the journal sleeves 167 and 170 supporting the shafts 171 and 172, which carry on their lower ends the dish shaped topping discs 173 and 174 respectively. Secured to the upper ends of the shafts 171 and 172 are the bevel gears 175 and 176 arranged within the housing 151, and adapted to mesh with the gears 163 and 164. Secured to the lower end of the shaft 155 is an auxiliary dish shaped topping disc 177, and secured to the shaft 152 at a point just outside the casing 151 is a sprocket wheel 180, engaged by an endless link belt 181, which in turn engages with a sprocket wheel 182 secured to the shaft 147.

The shafts 171, 172, and 155 all radiate from a common point, which is located midway of the machine and in line with the shaft 152, and the arc of the discs 173, 174, and 177 has a radius struck from this point. Thus it will be seen that the top of the beet will be cut in the form of a crown, thereby eliminating all of the non-usable portions and leaving only that part desirable for sugar purposes.

It will be seen by the foregoing construction that when the wheels 63 and 64 are rotated, motion is imparted to the shaft 152 through the medium of the sprocket and chain connection to the shaft 147, which in turn is driven by means of the gears 150, which mesh with the teeth 81 on said wheels. The topping discs 172, 173, and 177 are driven in the direction indicated by the arrows in Fig. 3 by the shaft 152, through the medium of the train of gears clearly shown in said figure.

A chute 183 adapted to catch the beet tops, weeds, grass, etc., and direct them to the ground or any suitable receptacle (not shown) is arranged between and supported by the standards 142 and 143, and is located below the topping discs 173 and 174, the ends of the tracks 133 and 135 joining together as at 184 at this point to form a part of the bottom of said chute.

Another chute 185 is supported by the standard 142 and is arranged adjacent the discs 173 and 177, to catch the topped beets and direct them to a wagon (not shown) which may travel alongside of the machine for this purpose.

In order that the topping discs may be properly adjusted with respect to the beet pulling mechanism, means are provided for swinging the housing 151 on the shaft 152 and holding it in such adjusted position, and to this end said housing is provided with ears 186 to which are pivoted at 187 a yoke 190 having threaded therein one end of a rod 191 which passes through a sleeve 192 pivoted at 193 to the standard 142. The rod 191 is provided with collars 194 arranged one on each side of the sleeve 192, and at its free end with the hand wheel 195. It will be seen by this arangement, that by loosening the nuts 161 on the ends of the shaft 157, and then turning the hand wheel 195, the topping disc may be swung to any desired position.

The rack-bar 110 is adapted to be held against further downward movement when its associated pulling device reaches a point near the ground, and is in a position ready to actuate to pull a beet, and in order that said holding point may be adjusted with respect to the surface of the ground, I provide a lever 200 which is pivoted at 201, to one of the radially disposed arms 131. The lever 200 is provided with the cam end 202 upon which the roller 139 secured to the rack bar 110, is adapted to ride and to be held thereby, and the hand lever 203, located within easy reach of the operator's seat 53, which is provided with the usual locking latch 204, adapted to engage with the teeth of the segmental rack 145. By this arrangement it will be seen that the operator may adjust the cam 202 from time to time to compensate for the sinking of the wheels 63 and 64 in the ground.

It is the main purpose of this invention to top the beet with reference to that part which projects out of the ground, and it has been found by experiment that the proper proportion is about one half, so with this proportion in view the mechanism is so arranged that the prongs 123 of the gripping jaws 122, will grasp the beet at a point just midway between the ground and its top and convey it to the topping discs in such manner that said prongs will always be an equal distance just below said topping discs. Thus it will be seen that the same proportion of that part of the beet which projects out of the ground will always be cut away.

The operation of the machine is as follows: The machine is drawn over the ground in the direction indicated by the arrow A, (see Fig. 1) and the wheels 63 and 64 carrying the beet pulling devices, rotate in the direction indicated by the arrow B through frictional contact with the ground. When the roller 138 on the shell 97, comes in contact with the cam roll 141, the particular pulling device with which it is associated is approximately above the beet to be pulled. Upon continued movement the roller 138 is caused to ride downwardly by the cam 141 which in turn draws the shell 97 downwardly. The rack-bar 110 is held from downward movement at this time by the engagement of the roller 139 with the cam 202, consequently the pinion 106 carried by the shell 97 is caused to revolve and in turn causes the rack-bar 111 to move downwardly at just twice the speed of the shell 97. The shell 97 and rack-bar 111 continue to move downwardly until the plate 115 carried by the rack-bar 111 comes in contact with the top of a beet. By referring to Fig. 9 which represents the relative position of the various working parts of the pulling mechanism in a normal or starting position, it will be seen that the plate 115 is just twice the distance from the surface of the ground as are the prongs 123 of the gripping jaws 122 carried by the shell 97, and for the sake of explanation, we will assume that the plate 115 is six inches from the ground and the prongs 123 are three inches from the ground, and assuming that the top of the beet projects three inches from the surface of the ground as shown in Fig. 10, it will be obvious that when the plate 115 moves three inches downwardly to contact with the beet, the prongs 123 have moved downwardly just one and a half inches, which brings them just midway between the top of the beet and the ground. Thus it will be seen that no matter what distance the beet projects above the ground, the prongs 123 will be brought to a position to grasp it at a point just half way between the ground and its top.

After the plate 115 contacts with the top of a beet and upon continued movement of the wheels 63 and 64, the spring 140 carrying the cam roll 141, yields to allow the roller 138 to pass, and at the same time the gripping jaws 122 are engaged by the cam track 132 and are pressed inwardly, thus causing the prongs 123 to project into the beet. The beet is then pulled out of the ground and carried upwardly by the wheels, and is caused to be placed into proper and exact relative position with the topping discs 173, 174, and 177, by means of the cam tracks 133 and 136, which engage with the rollers 138 and 139 respectively.

After the beet has become engaged by the crotch formed between the discs 173 and 174, the jaws 122 are spread apart at the junction 184 of the tracks 133 and 135, and is then severed by said discs. The body portion of the beet is carried around by the discs 173 and 177, and deposited in the chute 185 and the top of the beet drops into the chute 183. The disc 177 not only serves to direct the body portion of the beet to the chute 185, but also serves to cut away the ragged edges to shape it uniformly. It will also be noted that the disc 177 will co-operate with the discs 173 and 174 to cut away weeds, grass and other foreign matter, which otherwise might clog up the mechanism.

After the beet has become disengaged from the prongs 123, the pulling mechanism is again adjusted to proper relation to pull another beet by means of the tracks 134.

When it is desired to transport the machine over the road, it is obvious that the plow share 61 may be lifted clear from the surface of the ground, by the mechanism previously described, and in so doing, the plate 16 forming a part of the frame 12 will abut against the spacer bar 71 and in turn lift the wheels 62 and 63 from the ground.

It will be seen by the foregoing description that I have provided a machine which will automatically pull the beets from the ground, and present them to a topping mechanism, whereby they may be topped in regulated proportion to that part which projects above the ground.

What I claim is:

1. A beet harvesting machine, comprising a pulling mechanism adapted to grasp a beet at a point proportionate to that part which projects above the ground, a topping mechanism, and means for presenting the pulling mechanism in uniform relation to said topping mechanism, whereby the same proportionate amount of a beet will always be cut away.

2. A beet harvesting machine, comprising mechanism for grasping a beet approximately midway between its top and the ground, and means for operating said mechanism.

3. A beet harvesting machine, comprising mechanisms for pulling a beet and severing it approximately midway between that portion which projects above the ground and the ground, and means for operating said mechanisms.

4. A beet harvesting machine, comprising a beet pulling device provided with a pair of reciprocating members co-operating with each other to reciprocate at different speeds, one of the said members being adapted to contact with the top of a beet and the other of said members being provided with means for grasping a beet, and means for operating said members.

5. A beet harvesting machine, comprising a wheel adapted to be drawn over a row of beets provided with a plurality of beet pulling devices adapted to grasp a beet at a point proportionate to that portion which projects above the ground, a topping device for severing the beets, and means for adjusting said topping device with respect to said pulling devices.

6. A beet harvesting machine, comprising a plurality of beet pulling devices, a topping mechanism adapted to co-operate with said pulling devices for severing the beets, said topping mechanism comprising a plurality of dish shaped discs provided with knife edges arranged adjacent one another, and means for operating the mechanisms.

7. A beet harvesting machine, comprising a frame supported on wheels, a pair of wheels adapted to rest upon the ground one on each side of a row of beets journalled in said frame, a plurality of beet pulling mechanisms supported between said pair of wheels, said mechanism adapted to grasp the beets at a point proportionate to those portions that project above the ground, a beet topping mechanism supported on said frame, and means supported on said frame for adjusting said beet pulling mechanism with respect to said topping mechanism.

8. In a beet harvesting machine, a beet pulling mechanism comprising a slidably mounted shell, a plurality of jaws pivoted on said shell, a pinion journaled in said shell, a rack-bar carrying a gauge plate adapted to slide within said shell and engage with one side of said pinion, a second rack-bar adapted to engage with the opposite side of said pinion and to be guided by a cam track, a cam for operating said shell, and cam tracks for opening and closing said jaws.

9. A beet topping mechanism, comprising a plurality of cutting knives adapted to top a beet in the form of a crown, and means for operating said cutting knives.

10. In a beet harvesting machine, a rotary member comprising a pair of spaced wheels, a plurality of pairs of beet engaging prongs arranged between said wheels, means for moving the members of each pair of prongs toward each other to engage the beets, and means for moving the pairs of prongs inwardly toward the axis of the wheels.

11. In a beet harvesting machine, a rotary member comprising a pair of spaced wheels, a plurality of pairs of beet engaging prongs arranged between said wheels, means for moving the members of each pair of prongs toward each other to engage the beets, means for moving the pairs of prongs inwardly toward the axis of the wheels, and means arranged above said wheels for cutting the tops of the beets carried by said pairs of prongs.

12. In a beet harvesting machine, a pair of wheels spaced apart so as to traverse the ground at the sides of a row of beets, a plurality of frames arranged for sliding movement between said wheels, beet engaging members arranged in pairs on said frames, and means for actuating said frames to move said beet engaging members toward and away from each other.

13. In a beet harvesting machine, a pair of wheels spaced apart so as to traverse the ground at the sides of a row of beets, a plurality of frames arranged for sliding movement between said wheels, beet engaging members arranged in pairs on said frames, means for actuating said frames to move said beet engaging members toward and away from each other, and adjustable means for regulating the positions of said frames while the beet engaging members are moved toward each other.

14. In a beet harvesting machine, a rotary member, beet engaging means carried by said rotary member, beet topping means arranged above said rotary member, and means adapted to engage the rear portion of said rotary member for operating said beet topping means.

15. A beet harvesting machine, comprising mechanism for pulling a beet from the ground, mechanism for severing a beet, mechanism controlled by the top of the beet for automatically adjusting said pulling mechanisms with respect to the beets, and mechanisms for automatically adjusting the pulling mechanism with respect to the severing mechanism.

In witness that I claim the foregoing I have hereunto subscribed my name this 24th day of April, 1919.

SAMUEL C. BEALE.